United States Patent
Groepper

[15] 3,689,594
[45] Sept. 5, 1972

[54] CURING PROCESSES USING DI-(2-METHYLBENZOYL)PEROXIDE

[72] Inventor: Jurgen Groepper, Gunzburg, Germany

[73] Assignee: Pennwalt Corporation, Philadelphia, Pa.

[22] Filed: Dec. 31, 1970

[21] Appl. No.: 103,283

[52] U.S. Cl.............................260/861, 260/864
[51] Int. Cl..............................................C08f 21/00
[58] Field of Search............................260/861, 864

[56] References Cited
OTHER PUBLICATIONS

Blomquist, et al.; J. Am. Chem. Soc. 73, 3883– 3888 (1951)
Cooper; J. Chem Soc., 1951, 3106– 3113

*Primary Examiner*—Melvin Goldstein
*Attorney*—Carl A. Hechmer, Jr. and William D. Mitchell

[57] ABSTRACT

Improved processes for curing unsaturated polyester resin compositions by employing di-(2-methylbenzoyl) peroxide as a curing catalyst.

3 Claims, No Drawings

3,689,594

CURING PROCESSES USING DI-(2-METHYLBENZOYL)PEROXIDE

BACKGROUND OF THE INVENTION

This invention relates to the use of di-(2-methylbenzoyl) peroxide as a curing catalyst (free radical initiator) in unsaturated polyester resin compositions.

While dibenzoyl peroxide is a standard peroxide catalyst used industrially for curing of unsaturated polyester resins, it has several disadvantageous properties which have prompted research on better curing catalysts. For example, since the cure times of dibenzoyl peroxide are high, lower temperature peroxides have been tried. However, most low temperature peroxides are thermally unstable and decompose violently when allowed to warm to room temperature. Further, dibenzoyl peroxide dissolves at a relatively slow rate in unsaturated polyester resins, thereby further increasing the overall resin cure time cycle. Thirdly, dibenzoyl peroxide usually results in a cured resin having a light yellow or orange-yellow color in unpromoted (unaccelerated) and promoted systems, respectively. In seeking improved curing catalysts, it is also important that the catalyzed resin have a Tank or Pot Life (see procedure described in the Proceedings of the 24th Annual Technical Conference, 1969 Reinforced Plastics/Composites Division, The Society of the Plastics Industry, Inc., Resin Committee, Suggested SPI Procedure - Stability of Catalyzed Polyester Resin Tank Life, page 2) of at least 24 hours. The Pot Life of a peroxide is defined as the time for a 1 percent solution of the peroxide in the unsaturated polyester resin to gel, get stringy or solidify when held at 25° C.

BRIEF SUMMARY OF THE INVENTION

This invention concerns, in a process for curing polyester resin compositions with free radical initiators (curing agents), the improvement of employing as said initiator, an initiating amount of di-(2-methylbenzoyl) peroxide.

DETAILED DESCRIPTION OF INVENTION

It has now been discovered that di-(2-methylbenzoyl) peroxide is stable to decomposition at room temperatures, gives rapid cures of unsaturated polyester resins which have less color (in accelerated and unaccelerated cures) than resins comparably cured by dibenzoyl peroxide, dissolves rapidly in the uncured resin composition and has a Pot Life of several days.

Unsaturated polyesters which are used as the one component of the polyester resin compositions according to the present invention are, for instance, polyesters as they are obtained by esterifying preferably ethylenically unsaturated di- or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis-(2-hydroxy ethyl ether); propanediol-1,2; butanediol-1,3; 2,2-dimethyl propanediol-1,3; butene (2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, and others, or by aromatic dicarboxylic acids, such as phthalic acid, tetrahydrophthalic acid, and others and their anhydrides such as phthalic anhydride. The acids used as well as the alcohols employed may be substituted by other substituents, preferably by halogen. Examples of suitable halogenated acids are, for instance, tetrachloro phthalic acid; 1, 4, 5, 6, 7, 7-hexachloro bicyclo (2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

Peroxide levels of about 0.05 to 5.0 percent or more by weight of the curable resin composition can be used, preferably 0.1 to 2.0 percent. Curing temperatures of from about room temperature (20°–25° C.) to about 150° C. are normally employed, accelerators (such as N,N-dimethylaniline and other dialkylanilines or N,N-dimethyl p-toluidine) normally being added when curing at the lower temperatures to improve efficiency.

EXAMPLES

The following examples illustrate the invention but are not in limitation thereof. Parts are by weight unless otherwise indicated.

Example I - 82° C. SPI Exotherms of Di-(2-methylbenzoyl) Peroxide

Cure characteristics of di-(2-methylbenzoyl) peroxide and dibenzoyl peroxide were determined in an unsaturated polyester resin composition (a mixture of an unsaturated polyester and styrene monomer).

The unsaturated polyester was an alkyd resin (Acid No. of 45–50) made by esterifying the following components:

| Components | Quantity |
| --- | --- |
| Maleic anhydride | 1.0 mole |
| Phthalic anhydride | 1.0 mole |
| Propylene glycol | 2.2 moles |
| Inhibitor added (hydroquinone) | 0.013% |

Seven (7) parts by weight of the alkyd resin was diluted with three (3) parts by weight of monomeric styrene, the resulting composition having a specific gravity of 1.14 and a viscosity (Brookfield No. 2 at 20 r.p.m.) of 13.08 poise.

Curing Procedure: Gelation and cure characteristics of the initiators in the above resin were determined using the standard SPI Exotherm procedure ("SPI Procedure for Running Exotherm Curves - Polyester Resins," published in the Preprint of the 16th Annual Conference 00072Reinforced Plastics Division Society of the Plastics Industry, Inc., February 1961).

Using this procedure at 82° C. (180° F.), di-(2-methylbenzoyl) peroxide and dibenzoyl peroxide were employed, at peroxide levels equivalent in "active oxygen" content to 1 percent by weight of dibenzoyl peroxide (based on weight of curable resin), to cure the resin composition. The SPI Exotherm data and color of the resulting cured resins are shown in Table I:

TABLE I

| Peroxide | Gel (Min.) | Cure (Min.) | Peak (°F.) | Barcol | Color[1] |
|---|---|---|---|---|---|
| Di-(2-methyl-benzoyl) | 0.3 | 1.1 | 382 | 45 | Almost colorless |
| Dibenzoyl | 3.7 | 5.4 | 402 | 45 | Slight yellow |

(1 - color increases in the order: colorless < almost colorless < slight yellow < yellow < yellow-orange.)

The Tank Life of the unsaturated polyester resin composition with di-(2-methylbenzoyl) peroxide added, determined by the "Suggested SPI Procedure" described hereinabove at 25° C., was 5 days.

EXAMPLE II - ROOM TEMPERATURE

Accelerated Cures

The procedure of Example I was repeated, except that 0.1 percent by weight of N,N-dimethylaniline was added to the catalyzed resin as an accelerator and the resin was allowed to cure at room temperature (25° C.), with the following results:

TABLE II

| Peroxide | Gel (Min.) | Cure (Min.) | Peak (°F.) | Color |
|---|---|---|---|---|
| Di-(2-methyl-benzoyl) | 8.5 | 14.8 | 315 | Yellow |
| Dibenzoyl | 15.0 | 21.5 | 315 | Orange-yellow |

EXAMPLE III - RATES OF DISSOLUTION IN RESIN 0.5 gram of dibenzoyl peroxide (granular) and 0.5 gram of di-(2-methylbenzoyl) peroxide (granular) were added individually to 50 grams of the resin composition described in Example I. At 25° C., the resulting mixtures were mechanically stirred and the times for complete dissolution of the peroxides in the resin noted as tabulated below:

TABLE III

| Peroxide | Dissolution Time (minutes) |
|---|---|
| Di-(2-methylbenzoyl) | less than one minute |
| Dibenzoyl | 20 minutes |

EXAMPLE IV - THERMAL STABILITY 25 gram samples of di-(2-methylbenzoyl) peroxide (a mixture of 77.2 percent peroxide and 22.8 percent water by weight) were placed in thermostatted chambers held at 30° C. and 40° C. After four (4) weeks, the percent loss of assay (peroxide decomposition) was noted. During this time the stability to rapid decomposition was noted as shown below:

TABLE IV

| Temp. (°C.)/Time (Weeks) | % Loss of Assay[2] |
|---|---|
| 30/4 | 5.2 |
| 40/4 | 19.0 |

(2 - results show that little assay is lost at 30° C. in 4 weeks and, even at 40° C., is stable to rapid decomposition.)

What is claimed is:

1. In a process for curing an unsaturated polyester resin composition, said composition comprising (a) an unsaturated polyester selected from the esterification product of one or more ethylenically unsaturated di- or poly-carboxylic acids or their anhydrides with one or more saturated or unsaturated polyalcohols, in admixture with (b) an ethylenically unsaturated monomer, at curing temperatures in the presence of a curing catalyst, the improvement which comprises employing as said curing catalyst di-(2-methylbenzoyl) peroxide.

2. A process according to claim 1 wherein said resin composition comprises (a) the esterification product of propylene glycol, maleic anhydride and phthalic anhydride in admixture with (b) monomeric styrene.

3. A process according to claim 1 wherein said curing is accelerated by the addition of N,N-dimethylaniline.

* * * * *